(12) United States Patent
Drevö

(10) Patent No.: US 8,542,633 B2
(45) Date of Patent: Sep. 24, 2013

(54) ADMISSION CONTROL

(75) Inventor: Markus Drevö, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 412 days.

(21) Appl. No.: 12/838,709

(22) Filed: Jul. 19, 2010

(65) Prior Publication Data

US 2012/0014248 A1    Jan. 19, 2012

(51) Int. Cl.
*G01R 31/08* (2006.01)

(52) U.S. Cl.
USPC .......................................... 370/328; 370/230

(58) Field of Classification Search
USPC ........................... 370/230–234, 312, 328–338
See application file for complete search history.

(56) References Cited

U.S. PATENT DOCUMENTS

| | | | | |
|---|---|---|---|---|
| 2010/0027455 A1* | 2/2010 | Wang | ............................. | 370/312 |
| 2010/0110958 A1* | 5/2010 | Racz et al. | .................... | 370/312 |
| 2012/0008525 A1* | 1/2012 | Koskinen | ...................... | 370/253 |

OTHER PUBLICATIONS

International Search Report Corresponding to International Application No. PCT/SE2010/050855; Date of Mailing: Apr. 27, 2012; 3 Pages.
Written Opinion of the International Searching Authority Corresponding to International Application No. PCT/SE2010/050855; Date of Mailing: Apr. 27, 2012; 10 Pages.
3GPP TSG-RAN WG3 #65bis, R3-092180; Admission control, dropping and service ordering for eMBMS, Miyazaki, Japan, Oct. 12-16, 2009, pp. 1-3.
ETSI TS 136 444 V9.1.0, Technical Specification, LTE; Evolved Universal Terrestrial Radio Access Network (E-TRAN); M3 Application Protocol (M3AP)(3GPP TS 36.444 version 9.1.0 Release 9) Apr. 2010, pp. 1-52.
3GPP TSG-RAN WG3 #66bis, R3-100170, eMBMS multiplexing decision 2-steps approach, Valencia, Spain, Jan. 18-22, 2010, pp. 1-3.
3GPP TSG-RAN WG3 #64, R3-091300, ABBR based statistical multiplexing solution for eMBMS, San Francisco, California, May 4-8, 2009, pp. 1-6.

* cited by examiner

*Primary Examiner* — Ricky Ngo
*Assistant Examiner* — Iqbal Zaidi
(74) *Attorney, Agent, or Firm* — Myers Bigel Sibley & Sajovec, P.A.

(57) ABSTRACT

The present invention relates to a network node and a method in a network node for admission control of broadcast transmission sessions. The method comprises receiving a broadcast transmission session start request for a first broadcast transmission session, obtaining at least a first traffic statistics parameter related to said first broadcast transmission session, obtaining the available bit rate for the broadcast transmission area, and obtaining a re-synchronization parameter indicating the time between re-synchronization of transmissions for said broadcast transmission session. The method also calculates a first expected bit error rate based on said at least first traffic statistics parameter, said available bit rate and said re-synchronization parameter, and admits said first broadcast transmission session if said first expected bit error rate is less than a first bit error rate threshold.

16 Claims, 7 Drawing Sheets

Transition Matrix Time = 0

Transition Matrix Time = 10

| | | | | | | |
|---|---|---|---|---|---|---|
| 0.7252 | 0.1998 | 0.0548 | 0.0149 | 0.0040 | 0.0010 | 0.0002 | 0.0001 | 0
| 0.7238 | 0.1997 | 0.0552 | 0.0153 | 0.0043 | 0.0012 | 0.0003 | 0.0001 | 0
| 0.7204 | 0.1994 | 0.0560 | 0.0163 | 0.0051 | 0.0017 | 0.0006 | 0.0002 | 0
| 0.7137 | 0.1987 | 0.0576 | 0.0182 | 0.0065 | 0.0026 | 0.0010 | 0.0004 | 0
| 0.7011 | 0.1972 | 0.0599 | 0.0211 | 0.0088 | 0.0040 | 0.0018 | 0.0007 | 0
| 0.6780 | 0.1932 | 0.0623 | 0.0247 | 0.0118 | 0.0059 | 0.0028 | 0.0011 | 0
| 0.6278 | 0.1815 | 0.0620 | 0.0271 | 0.0141 | 0.0074 | 0.0036 | 0.0015 | 0
| 0.4861 | 0.1418 | 0.0502 | 0.0231 | 0.0125 | 0.0068 | 0.0034 | 0.0014 | 0
| 0.4292 | 0.1276 | 0.0485 | 0.0245 | 0.0143 | 0.0080 | 0.0041 | 0.0017 | 0.0000 |

Figure 7

ADMISSION CONTROL

TECHNICAL FIELD

The present invention relates to the field of radio telecommunications. More specifically, the present invention relates to admission control for broadcast services.

BACKGROUND OF THE INVENTION

While embodiments are described below in relation to MBMS as implemented in LTE, the invention finds application also in other cellular radio networks such as WCDMA, GSM, CDMA etc, but may also be applicable in other type of networks implementing broadcast services.

Multimedia Broadcast Multicast Service (MBMS) for Long Term Evolution (LTE) networks is available in the 3GPP standard from release 9. An overview of the MBMS system is given in chapter 15 in the 3GPP technical specification TS 36.300.

The Mobility Management Entity (MME) and MBMS Gateway (GW) are connected via the Sm interface as described in 3GPP technical specification TS 23.246.

When a new session is about to start, the MBMS GW sends control plane messages to the MME containing information regarding the service, such as Quality of Service (QoS) profile. The QoS profile comprises, amongst other things the Maximum Bit Rate (MBR) and the Guaranteed Bit Rate (GBR) for the service in the MBMS Service Area. This message is the MBMS Session Start Request as specified in the 3GPP technical specification TS 29.274, section 7.13.1. The MME signals to the Multi-cell/multicast Coordination Entity (MCE) over the M3 interface that a new session starts using the MBMS Session Start Request message, this message is describe in 3GPP TS 36.444. The MCE controls a Multimedia Broadcast multicast service Single Frequency Network (MBSFN) area, normally consisting of cells belonging to several eNBs.

The MBMS transmissions are synchronized over the MBSFN area. That is, over the MBSFN area, possibly comprising several different eNBs and several different cells, all transmission should be simultaneous.

The MCE sends the MEMS Session Start Request message to the eNBs in its MBSFN area, as specified in 3GPP TS 36.443. The eNB's prepare resources for receiving user data according to the received information. User data received over M1 for the session is then broadcasted in the MBSFN area by the eNBs.

In release 9, there is an assumption that MBR equals GBR. For MBMS that means that resources have to be allocated for transmitting data at the maximum bit rate.

This has the drawback that for two services that has MBR=GBR=100, the total amount of resources that has to be allocated is 100+100=200.

To mitigate this problem MBMS shall, in later releases, exploit statistical multiplexing in order to more efficiently use the available resources. This means that since bitrates for services normally varies over time. Two services with MBR=150 and GBR=70 may, depending on the requirements, only require resources to carry the total bit rate 160.

The information provided to the MCE useful for admission control is MBR, GBR and the QCI (QoS Class Identifier) within the QoS IE. The currently standardized QCI parameters are found in Table 6.1.7 in 3GPP technical specification TS 23.203, and shows that different services accept different time delays and packet loss rates.

SUMMARY OF THE INVENTION

Since statistical multiplexing is used, and consequently less resources than the MBR is allocated in the different eNBs, occasionally more data may arrive from the content provider, via the MBMS GW, to the different eNBs than what the different eNBs have allocated resources for. This data needs to be buffered.

However, over time, given that the average bit rate allocated in the eNBs is equal to, or exceeding the bit rate received from the content provider all data will be transmitted.

The main difference being that if resources are allocated in the eNBs to cope with the MBR, essentially no data would have to be buffered since the eNBs would always have enough resources to send all data arriving immediately.

It should be made absolutely clear that the different eNBs may have a need to in any event store data arriving from the content provider before transmission to the User Equipment (UE). In fact, the way MBMS is working each eNB need to store arriving data packets before sending, waiting for the correct timing to achieve synchronisation. This is, however not what is described above.

As stated above, on average all data would be transmitted, however due to the workings of broadcast transmissions, synchronisation between eNBs need to take place at regular intervals, and data may be present in the buffers at such occasions. That is, when ever re-synchronisation of the MEMS transmissions need to take place, the data currently in the buffer, i.e. non-scheduled data, will be dropped, adding to the bit error rate. This effect should be taken into consideration when designing an admission control for the MBMS services.

It is therefore an object of the disclosure to provide a method and a network node for admission control which considers the above circumstances and at least alleviates some of the associated problems.

These objects among others are, according to at least some embodiments, attained by a method in a network node for admission control of broadcast transmission sessions. The method comprises receiving a broadcast transmission session start request for a first broadcast transmission session, obtaining at least a first traffic statistics parameter related to said first broadcast transmission session, obtaining the available bit rate for the broadcast transmission area, and obtaining a re-synchronisation parameter indicating the time between re-synchronisation of transmissions for said broadcast transmission session.

The method also calculates a first expected bit error rate based on said at least first traffic statistics parameter, said available bit rate and said re-synchronisation parameter, and admits said first broadcast transmission session if said first expected bit error rate is less than a first bit error rate threshold.

By obtaining a traffic statistics parameter, further knowledge is gained for making good decisions with regards to if a broadcast session can be admitted or not. By further more taking into consideration the time between re-synchronisation together with available bit rate and the traffic statistics parameter an even better base is founded for admittance decisions.

According to a further embodiment said first expected bit error rate is calculated by estimating the average number of bits remaining in a transmit buffer for said broadcast transmission session at re-synchronisation using said at least first traffic statistics parameter and dividing by the estimated number of transmitted bits for said first broadcast transmission session during the time between re-synchronizations.

According to the embodiment above, by knowledge of a traffic statistics parameter and a re-synchronisation parameter, as well as the available bit rate for the broadcast area, it is, among other things, possible to determine an expected amount of data which will be dropped at each re-synchronization time. This dropped data will be added to the total data loss during transmission from the content provider to the user equipment and will thus be valuable for determining if the session should be admitted or refused. Clearly other parameters may also be included in taking a decision for admittance of the broadcast session.

According to another embodiment a broadcast transmission session start request for a second broadcast transmission session is received, and at least a second traffic statistics parameter related to said second broadcast transmission session is obtained.

The first expected bit error rate is re-calculated based on said at least first and second traffic statistics parameter, said available bit rate and said re-synchronisation parameter, and a second expected bit error rate is calculated based on said at least first and second traffic statistics parameter, said available bit rate and said re-synchronisation parameter.

The second broadcast session is admitted if the re-calculated first expected bit error rate is less than the first bit error rate threshold and the at least second expected bit error rate is less than a second bit error rate threshold.

By using both first and second traffic statistics parameter for the first and second broadcast transmission and comparing with both first and second thresholds before admitting the second broadcast session a better admission control is achieved, while resource utilization through statistical multiplexing may be improved.

A network node adapted to perform admission control of broadcast transmission sessions comprising processing hardware configured to execute any of the methods as specified in any of claims 1 to 9.

Further characteristics of the invention and advantages thereof will be evident from the following detailed description of embodiments of the invention.

BRIEF DESCRIPTION OF THE DRAWINGS

The present invention will become more fully understood from the detailed description of embodiments given herein below and the accompanying FIGS. 1 to 7, which are given by way of illustration only.

DETAILED DESCRIPTION OF DIFFERENT ASPECTS OF THE INVENTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
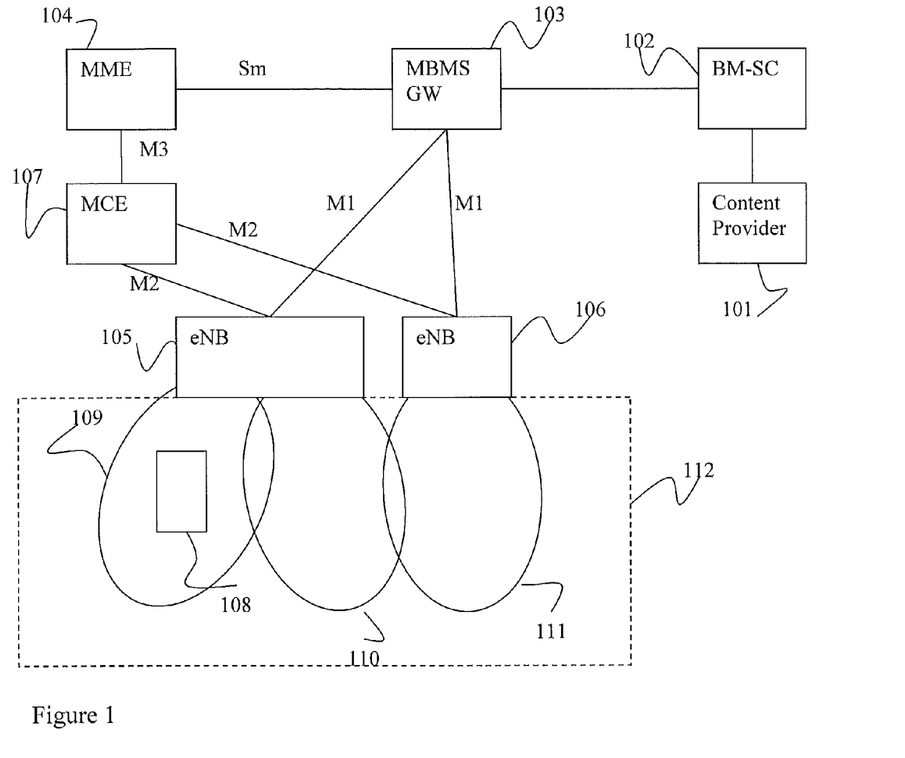
FIG. 1 is a schematic block diagram according to an embodiment on which different network entities for a broadcast service is disclosed.

FIG. 1 is a schematic illustration of an exemplary broadcast transmission network according to one embodiment. A content provider 101 is providing a service using broadcasting and is connected to a BM-SC 102, which in turn is connected to the MBMS GW 103. The MEMS GW 103 is connected over a Sm interface to MME 104 and through a M1 interface to a first eNB 105 and a second eNB 106. The MME is connected to a MCE 107 using a M3 interface and finally the MCE 107 is connected to the first and second eNB 105 and 106, respectively over a M2 interface.

It should be noted that the described network configuration is only one way of implementing a broadcast network and other nodes may be present in other embodiments. For instance, the MCE node may be implemented in an eNB, sharing the same hardware. Also, the broadcast network may comprise more than one MCE 107 located in their own nodes, or co-located with a respective eNB.

Each node are fitted with processing hardware and memory and adapted to perform different tasks associated with telecommunications networks. For instance are the first and second eNBs fitted with processors and transceivers and configured to communicate with user equipments (UE), of which one is shown and denoted 108, located in radio cells 109, 110 and 111, over a radio interface.

Finally, the exemplary radio cells 109, 110 and 111 are grouped into a MBSFN area 112. It should be made clear that a broadcast network, such as a MEMS network, may comprise many more than two eNBs or three radio cells.

Figure 2:
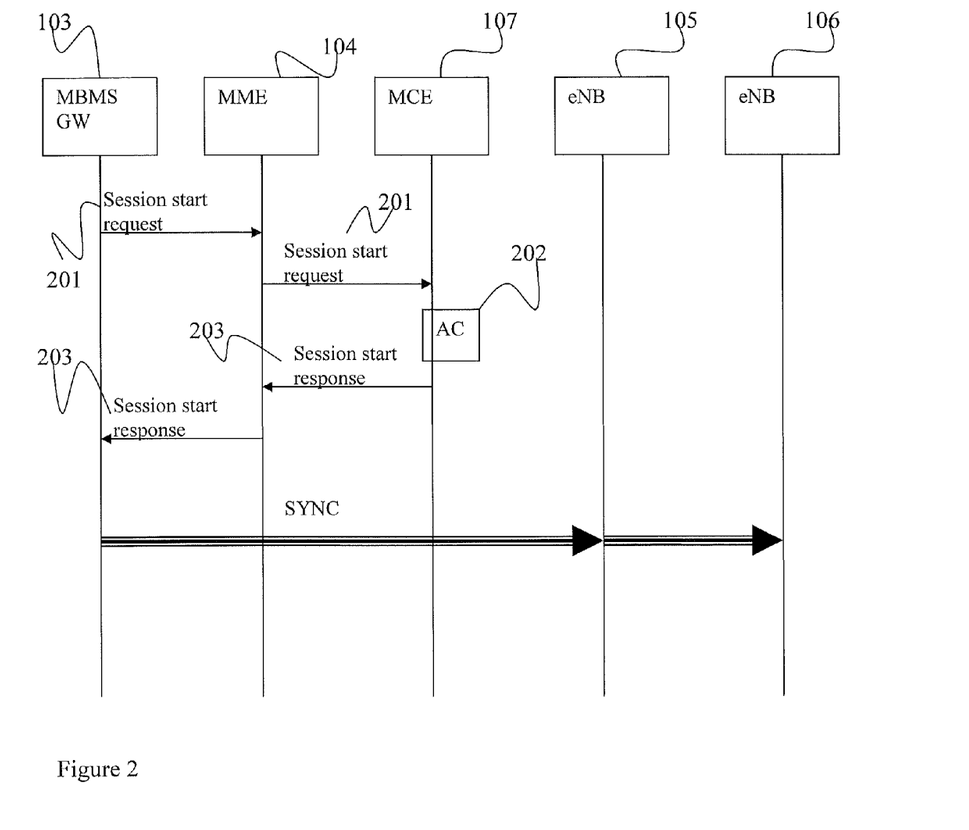
FIG. 2 is a schematic signalling diagram illustrating messages sent between different network nodes in FIG. 1 according to one embodiment.

FIG. 2 is a schematic signaling diagram illustrating signaling between the network entities in FIG. 1 for setting up a MBMS session according to one illustrative embodiment. The MEMS GW 103 sends a MEMS SESSION START REQUEST message 201 to the MME 104 over the Sm interface. The MEMS SESSION START REQUEST 201 comprises information elements carrying data related to the MBMS session to be set up. According to the present embodiment these data comprise an indication of which distribution the traffic for the present MEMS session will follow. These may for instance be a normal distribution, an exponential distribution, a flat distribution, a triangle distribution or a discrete normal distribution or any other of a multitude of different distributions.

In addition to the traffic distribution a mean value of the traffic intensity is provided and a measure of the variance of the traffic distribution. Thus, these parameters make it possible to estimate an average bit rate, as well as how much this bit rate may vary from one received packet to the next.

The parameters may be different depending on which distribution is indicated. For instance if the exponential distribution is indicated it may suffice to provide a lambda value.

The lambda value indicated both the mean traffic intensity, as well as the standard deviation, which is 1/lambda. For a normal distribution the mean value and the standard deviation, or variance may be provided, for a flat and for a triangular distribution the mean value may be provided as well as the value for which the distribution assumes the value zero.

According to other embodiments, the average bit rate and standard deviation may be estimated using the Guaranteed Bit Rate and the Maximum Bit Rate. According to this embodiment the average bit rate=GBR and the standard deviation= (MBR−GBR)/2.

Further more, according to other embodiments, other types of traffic parameters can be provided indicating for instance burstiness of the MBMS traffic etc.

Other parameters are also provided, such as the QCI indicator.

The MEMS SESSION START REQUEST message 201, together with the above mentioned parameters are forwarded to the MCE 107, where an admission control, to be further elaborated below, is made. If the admission control is successful a MEMS SESSION START RESPONSE 203 is sent from the MCE 107 to the MME 104, and forwarded to the MBMS GW 103. According to other embodiments, the broadcast session may be sent over a wider area incorporating more than one MCE. In this case the MBMS SESSION START REQUEST message is sent to several MCEs. According to one embodiment, a MEMS SESSION START FAIL message is sent (not shown) to the MME 104 if the admission control 202 fails.

After the MEMS session has been admitted, the MBMS session is set up using a SYNC protocol between the MEMS GW 103 and the eNBs 105 and 106 for transmission of broadcast data to the different UEs 108 in the MBSFN area 112.

According to some embodiments the SYNC protocol is terminated in the BM-SC 102.

Figure 3:
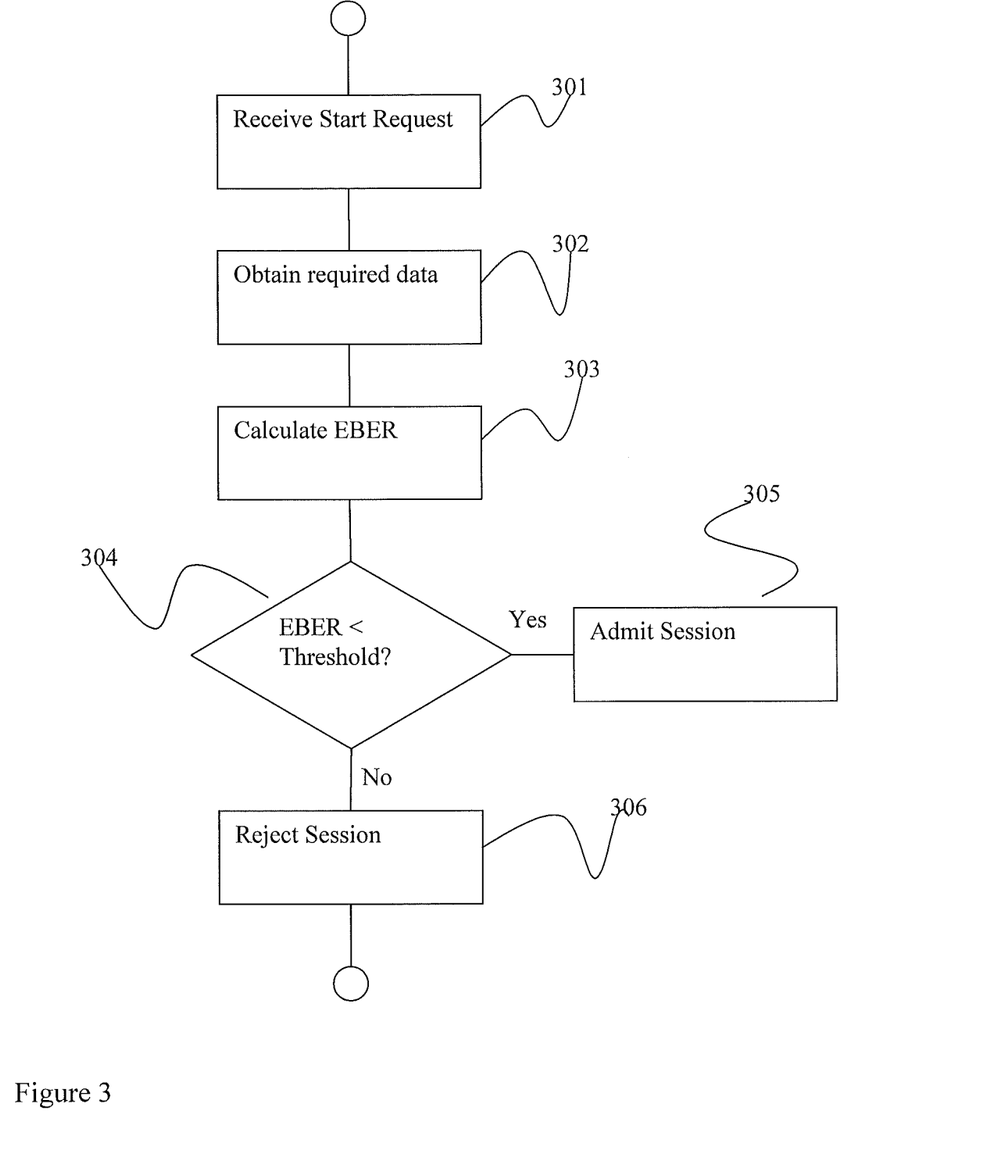
FIG. 3 is a schematic flow diagram depicting different method steps for the admission control of a broadcast service according to an embodiment.

FIG. 3 is a schematic flow diagram illustrating the admission control 202 in FIG. 2. A MBMS SESSION START REQUEST message 201 is received in step 301 indicating that admission control must be performed. In step 302 the necessary data for performing the admission control is obtained.

According to one embodiment the received MEMS SESSION START REQUEST message comprises information relating to the traffic distribution, mean value and standard deviation.

According a further embodiment the MCE is configured with a re-synchronization parameter, referred to as T, indicating the time between re-synchronization of the MEMS session, as well as the available bit rate in the MBSFN area 112.

Consequently, re-synchronisation are according to some embodiments scheduled at regular intervals.

For the present embodiment we assume that the received traffic distribution is a normal distribution having a mean value of $\mu_1$ and a standard deviation of $\sigma_1$.

In step 303 the MCE 107 calculates the amount of data that are expected to be non-scheduled for the session when the eNB has to drop data i.e. at the time of re-synchronization. The expected amount of data dropped in case of normal distribution is $D_1=f(T, \mu_1, \sigma_1)$.

The function f above thus estimates the number of bits remaining in the transmit buffer for the MEMS session given the mean value and standard deviation for the traffic distribution assigned for the MEMS session and the time T between re-synchronisation of the transmission by the different eNBs in the MBSFN area.

The function f may be derived analytically, or when this is not possible, a simulation may be used to tabulate values for D given different T, $\mu_1$, $\sigma_1$. This may of course also be done for other distributions having other traffic statistics parameters.

To tabulate f a model using Markov chains may be used. A value $p_{i,j}$ is assigned for the probability for a transition from one state i, of the buffer to another state j, wherein a state of the buffer is taken to mean how many bits the buffer is holding. Depending on the implementation one state can represent 1 bit, 5 bits, 500 bits or any number of bits, it may also represent a transmission packet or frame of a particular number of bits for instance depending on the assigned resources for the MEMS session.

If we for the ease of explaining assume that a state represents one bit, $p_{0,1}$ is the probability that, given that the buffer is empty, i=0, the buffer in the next time event would contain 1 bit, j=1. Thus, that the scheduler received 1 bit more in this particular time instance than it was able to transmit.

Another example is, $p_{100,90}$ which is the probability that given that the buffer contains 100 bits, that the buffer in the next time event would contain 90 bits. Or expressed differently, given that the buffer contains 100 bits, what is the probability that the scheduler will receive 10 bits less than the available bit rate, so that the amount of bits in the buffer will be reduced to 90 bits.

Given the traffic distribution one can then construct a N×N transitions matrix P, having elements $P_{i,j}$, i=[0 ... N−1], j= [0 ... N−1].

If M is the number of scheduled transmissions between each re-synchronisation event, or expressed differently the number of scheduled transmissions during the time T, the matrix product P*P ... *P, where P is multiplied by itself M times represents the probability that the buffer will be in a particular state at re-synchronisation.

The expected number of dropped bits, at each re-synchronisation event is then given by:

$$E[\text{dropped} \cdot \text{data}] = \sum_{n=0}^{N-1} n\alpha p_{1n}^{M}$$

Where α=the amount of bits represented by each state.

The expected bit error rate (EBER) is then calculated by:
EBER=E[dropped data]/(T*μ)

In step 304 EBER is compared to a threshold value and if EBER is less than the threshold the MBMS session is admitted 305, and else rejected 306.

Consequently, according to one embodiment an expected bit error rate is calculated by estimating the average number of bits remaining in a transmit buffer for said MBMS session at re-synchronisation using said at least first traffic statistics parameter and dividing by the estimated number of transmitted bits for said first broadcast transmission session during the time between re-synchronizations. According to one embodiment the MCE 107 receives a QCI with the MBMS SESSION START REQUEST message, indicating a maximum bit error rate allowed for the session. In this embodiment the threshold value is based on the maximum bit error rate. The maximum bit error rate may for instance be multiplied by a factor less than 1 to form the threshold, since the maximum bit error rate indicated by the QCI should cover all bit losses for the complete transmission.

Figure 5:
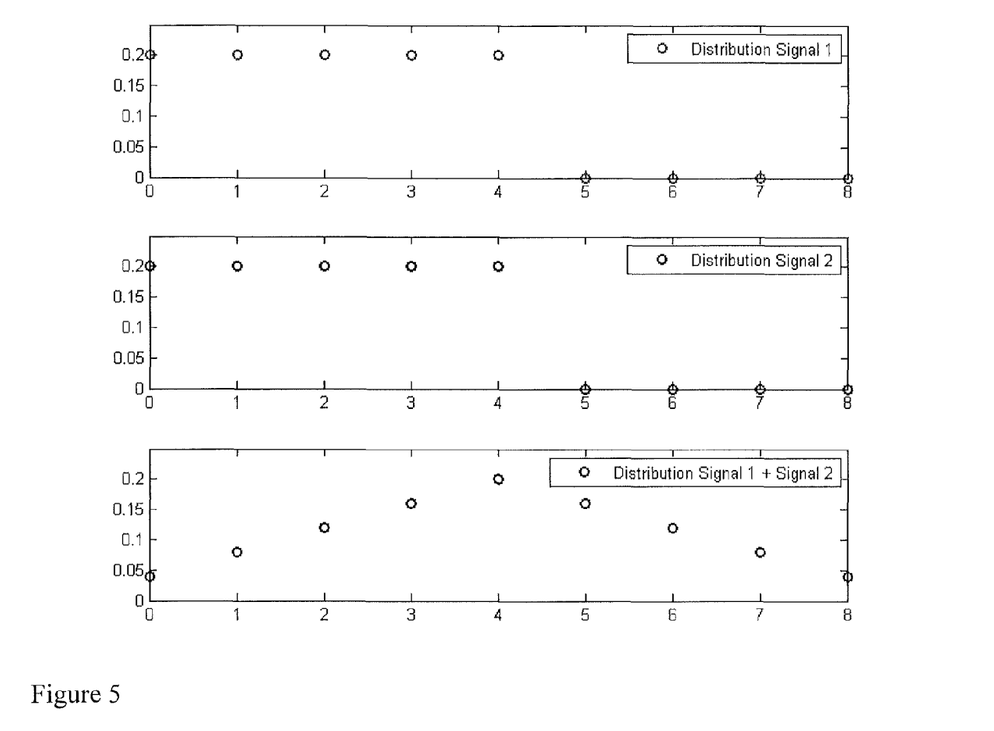
FIG. 5 is a schematic illustration of a traffic distribution for a first and a second MEMS session as well as the combined traffic distribution for the first and second MEMS sessions.

FIG. 5 is a schematic view of two MEMS session distributions to illustrate the workings of particular simplified exemplary embodiments. The top most diagram is the bit rate distribution of a first MBMS session, the middle diagram is the distribution of a second MEMS session and the diagram at the bottom is the cumulative distribution for both MBMS sessions. In this very basic example illustrating the admission control the MCE receives the complete distribution of the signals.

According to other embodiments the MCE 107 may receive the average bit rate, the maximum bit rate and an indication of the type of distribution. For both the distributions indicated in FIG. 1 this would be 2, 4 and uniform.

Assuming that the first and second MBMS sessions are sharing the same resources and that the distributions are both uniform. The distribution of the sum of the signals is given by the convolution as shown.

Figure 6:
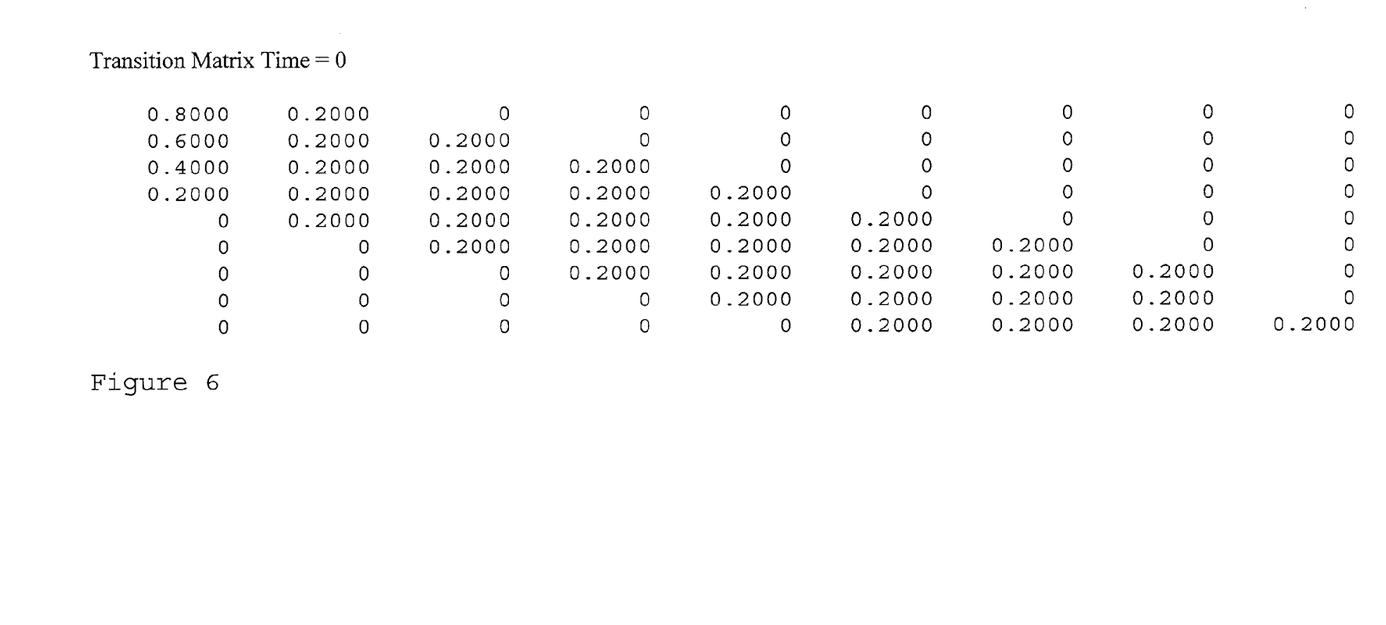
FIG. 6 is a transition matrix for the traffic distribution for the first MBMS session in FIG. 5 given a resource allocation in the MBSFN area of 3 bits per time unit.

According to this embodiment a calculation of a transition matrix P for MBMS session is made. Assuming that at each time instant scheduling is made, three bits of data is available, that is B=3, then the transition matrix is as shown by FIG. 6.

Lets denote the positions $p_{i,j}$; i=[0 . . . 8], j=[0 . . . 8] $P_{0,0}$=0.8 means that the probability that the system remains in state zero the next time step is 0.8. State zero means that zero data is queued, state 1 that one bit is queued up to state 9 where eight or more bits are queued.

$p_{0,1}$=0.2 means that the probability that the system moves to state one the next time is 0.2. That is, there is zero bits in queue and there will be one bit in queue in the next time interval. This can be realized by looking at the top or the middle diagram in FIG. 5.

$p_{1,0}$=0.6 means that the probability that the system changes from state one to state zero in the next time is 0.6. That is, there is one bit in queue and there will be zero bits in queue in the next time interval.

According to the distribution function, the average bit rate is 2 and the maximum bitrate is 4. Standard deviation does not have to be used in this example since the transition matrix is calculated based on the distribution function.

For other embodiments where the signal follows a normal distribution the transition matrix is calculated based on the knowledge that the distribution is normally distributed with a specified mean bitrate and bitrate variance or standard deviation.

Figure 7:
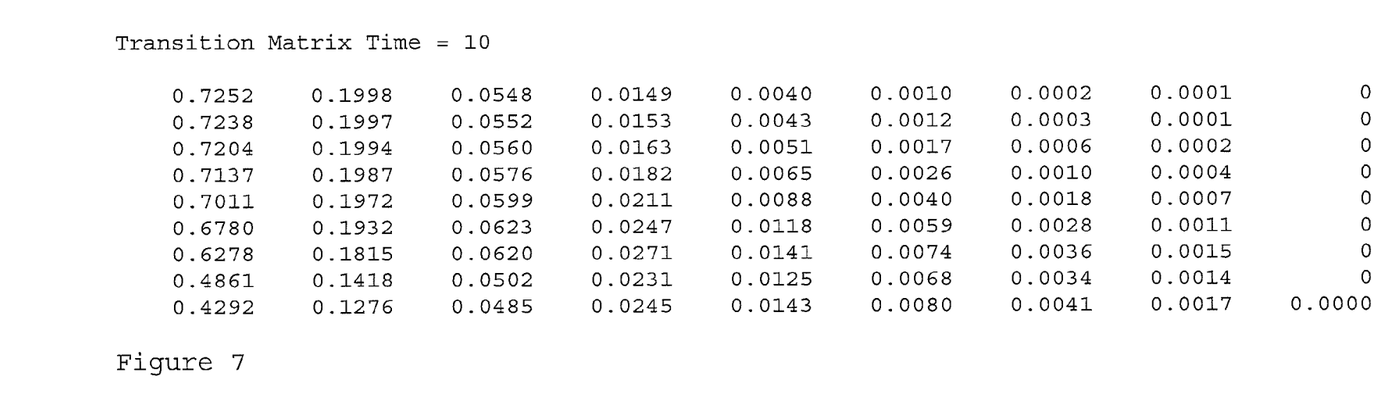
FIG. 7 is the transition matrix in FIG. 6 after 10 time units. The is the transition matrix in FIG. 5 multiplied by itself 10 times.

Data not scheduled is queued and at each re-synchronisation event will the data be dropped. To find the probabilities that the buffer contains a specific number of bits at each re-synchronisation event, a T step transition matrix is formed, where T indicates the number of time steps between each re-synchronisation. It is calculated by multiplying the matrix P T times with itself. Thus, assuming the re-synchronisation occur every 10 time step, P need to be multiplied by itself 10 times. P10 is shown in FIG. 7.

Since the interesting values are the probability that the system is in a particular state given that it started without any data, it is the first row that is interesting. That is: $P^{10}$ (1, 1 . . . 9)=β=[0.7252 0.1998 0.0548 0.0149 0.0040 0.0010 0.0002 0.0001 0].

The probability that no queue exist when packets have to be dropped is 0.7252. The expected number of bits to be dropped, at each re-synchronisation event is: 0.7252*0+0.1998*1+0.0548*2+0.0149*3+0.0040*4+ 0.0010*5+0.0002*6+0.0001*7+0*8=0.3770

The amount of data sent during T steps is: (average bit rate)*T=2*10=20. Hence, the expected bit error rate is 0.3770/20=0.0188. It is also possible to estimate the probability that a burst error exceeds a particular size.

The last state indicates the probability that the system has a queue equal or longer than 8. This factor has to be small in order for the model to be reliable.

A similar calculation can be made for admittance of the second session by using the combined traffic distributions as indicated at the bottom most diagram in FIG. 5, e.g. the triangle distribution of the combined signals. Assuming that at each time instant scheduling is made six bits of data is available for transmission e.g. the allocated resources correspond to 6 bits. According to the distribution function, the average bit rate is 4 and the maximum bit rate is 8.

In this case the corresponding vector β becomes:
[0.8481 0.0889 0.0493 0.0093 0.0033 0.0008 0.0002 0.0001 0.0000 0.0000 0.0000 0.0000 0.0000 0.0000 0.0000 0.0000]

The expected number of bits to be dropped is:
β*[0 1 2 3 4 5 6 7 8 9 10 11 12 13 14 15]$^T$=0.2346

Since the 15'th state is small, and where the second vector represents the number of bits per state.

The amount of data sent during T steps is: (average bit rate)*T=4*10=40. Hence, the expected bit error rate if the second MBMS session is admitted is 0.2346/40=0.0059.

If the requirement for the first session, or the second session, was higher than 0.0059, the second session would not be admitted.

Consequently, if, according to other embodiments, a further MEMS SESSION START REQUEST is received, the traffic statistics parameters received for both the first and the second MEMS session are used in calculating a first and second EBER for both the first MBMS session and the second MBMS session, respectively.

If both the first and second EBER is lower than first and second thresholds, respectively, the second MBMS session is admitted.

Figure 4:
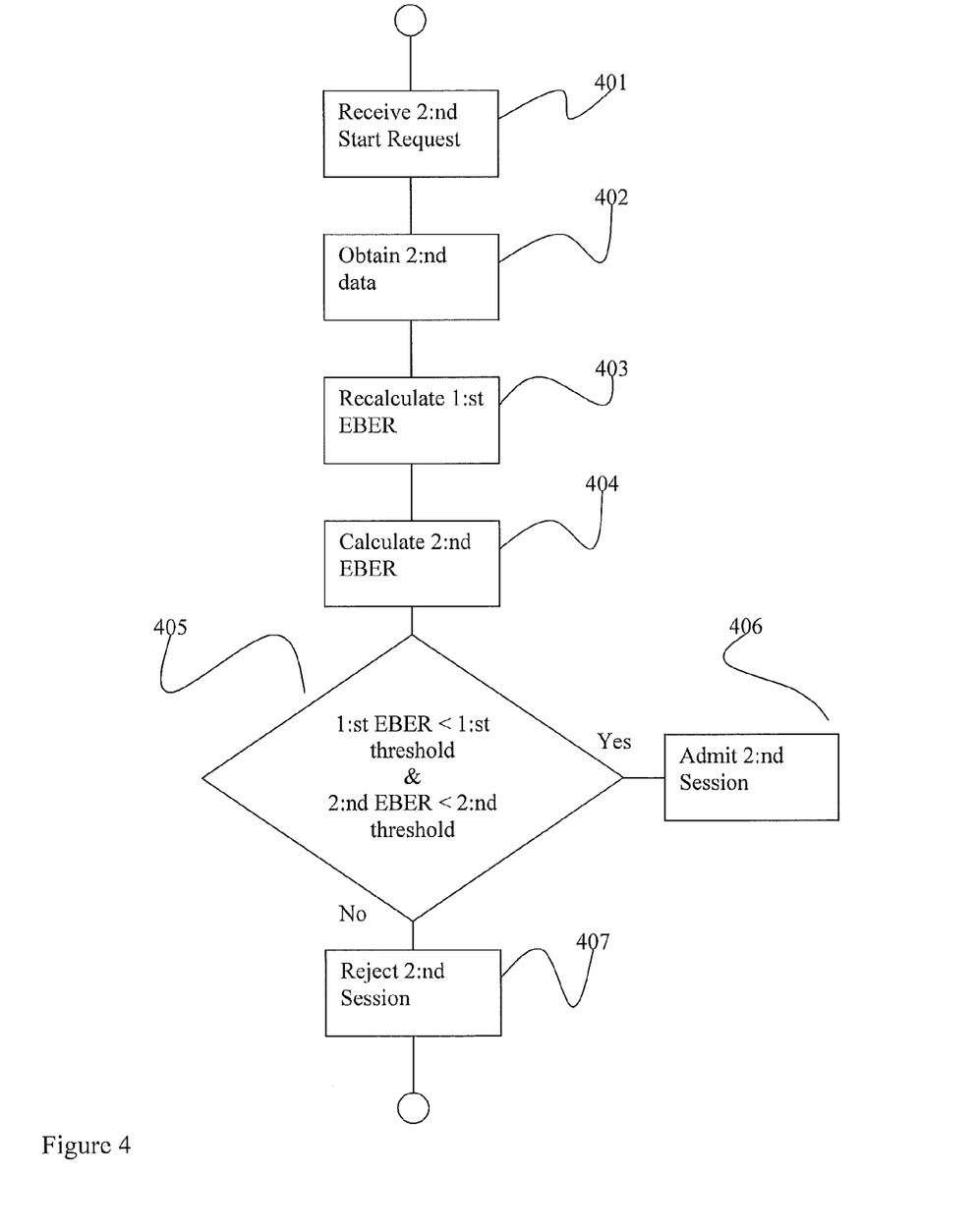
FIG. 4 is schematic flow diagram illustrating method steps for admission control of a second broadcast service according to an embodiment.

FIG. 4 is a schematic flow diagram according to one embodiment, where in a step 401 a broadcast transmission session start request for a second broadcast transmission session is received. In step 402 at least a second traffic statistics parameter related to said second broadcast transmission session is obtained.

According to one embodiment the traffic statistics parameter comprises a traffic distribution and associated parameters as has been disclosed previously, as well as an indication of a tolerable bit error rate, for instance indicated by a QCI indication.

In step 403, the first EBER is re-calculated based on the received first and second traffic statistics parameters, said available bit rate B, and said re-synchronisation parameter T.

In step 404 a second EBER is calculated based on the first and second traffic statistics parameters, the available bit rate B, and the re-synchronisation parameter T.

In step 405 the first and second EBER is compared to a first and second threshold, respectively and the second broadcast transmission session is admitted 406 if the re-calculated first EBER is less than the first threshold and the second EBER is less than a second threshold, else the second MBMS session is rejected 406.

In the following exemplary embodiment both sessions follow a normal distribution, which may be used to model for instance video or voice.

The first and second session has identical priorities and if the second service should be admitted, the resources must be sufficient to fulfil the quality requirements for both signals.

Assuming the distribution for the first session is N(μ1, σ1) and for the second session is N(μ1, σ1).

According to other embodiments, the average bit rate and standard deviation may be estimated using the Guaranteed Bit Rate and the Maximum Bit Rate. According to this embodiment the average bit rate=GBR and the standard deviation= (MBR−GBR)/2.

The MCE calculates the amount of data expected to be non-scheduled for the first session and the second session when the eNB has to drop data, i.e. at re-synchronisation, assuming that the second session is admitted. The expected amount of data dropped in case of normal distribution is $D=f(T, \mu 1, \mu 2, \sigma 1, \sigma 2)$ which, assuming normal distribution, may be simplified to $D=f(T, \mu, \sigma)=f(T, \mu 1+\mu 2, \text{sqrt}(\sigma 1*\sigma 1+\sigma 2*\sigma 2))$ where sqrt denotes the square root.

The MCE calculates the expected total drop rate for $R=D/\mu$ and the drop ratio for each session. In this example, $\mu 1=\mu 2$ and $\sigma 12=\sigma 22$. The drop rates for each session becomes $R1=R2=D/(\mu 1+\mu 2)$ because of equal treatment of the admitted services.

The MCE compares the drop rate R1 with the allowed drop rate provided by the QCI=q1 and the drop rate R2 with the allowed drop rate provided by the QCI=q2. If $R1 \leq q1$ and $R2 \leq q2$ the session is admitted and if $R1>q1$ or $R2>q2$ the new session is rejected. Note that the values q1 and q2 may be different. Other parameters than the drop rate may also be considered such as time delays and error burst.

The performance depends on how the scheduling is performed in the eNB. Here, the results are based on a fair treatment of services with the same priority.

The two embodiments use the same MBMS transmission model. A random amount of data arrives to the MBMS GW at random times. Here, the time between data arrival is modelled by an exponential distribution and the amount of data by a uniform distribution.

Assuming that the scheduler is able to schedule 80 bits each time interval and that the MCE has the following information about the two signals: Mean bit rate=27.5868, Standard deviation bit rate=30.5144, allowed drop rate=0.001

The first and second sessions should be treated identically if both are admitted by the MCE. The MCE therefore assumes that the eNB applies a fair scheduling algorithm. In the present embodiment data is scheduled first for one session for each 80-bit slot and the second in the next and so forth.

The MCE has also been configured with the time between re-synchronisation, i.e. that the time between that eNB drops non-scheduled data in the buffer is 10 seconds.

The present embodiment shows that the MCE may evaluate how a new service impacts the already admitted services and may reject new requests based on the quality of the transport channel.

The MCE calculate the data drop rates for session 1 and session 2, if session 2 is admitted to 0.0018 which is more than the allowed drop rate=0.001.

With an allowed drop rate of 0.001, the second session cannot be admitted. However, if the allowed drop rate was lower, say 0.01, the MCE may admit the second session in its MBSFN area.

The MBR of the first session is estimated, by simulations, to 210. That is, an implementation according to prior art would need to allocate resources for 210 bits per time interval. In order to broadcast the first session, an MCE implementation using an embodiment disclosed here would use resources corresponding to 80 bits per time, that is $80/210 \approx 38\%$ of the resources compared to the currently available method in MEMS release 9.

Further gain is achieved by allowing a larger T, that is a longer time between drops of non-scheduled data in the eNB. If this time is extended from 10 to 20 seconds the drop rate when admitting both signals becomes 9*10−4<0.001.

The radio resources used for admitting both sessions compared to what is required in prior art MEMS implementations would then be $80/(210+210) \approx 19\%$.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method in a network node for admission control of broadcast transmission sessions in a broadcast transmission area, the method comprising:
   receiving a broadcast transmission session start request for a first broadcast transmission session,
   obtaining at least a first traffic statistics parameter related to said first broadcast transmission session,
   obtaining an available bit rate for the broadcast transmission area,
   obtaining a re-synchronization parameter indicating a time between re-synchronization of transmissions for said first broadcast transmission session,
   calculating a first expected bit error rate based on said at least first traffic statistics parameter, said available bit rate and said re-synchronization parameter, wherein said first expected bit error rate is calculated by estimating an average number of bits remaining in a transmit buffer for said first broadcast transmission session at re-synchronization using said at least first traffic statistics parameter and dividing by an estimated number of transmitted bits for said first broadcast transmission session during the time between re-synchronization, and
   admitting said first broadcast transmission session if said first expected bit error rate is less than a first bit error rate threshold.

2. The method according to claim 1, wherein said at least a first traffic statistics parameter comprises a mean value indicating an expected average amount of received bits per time interval and a standard deviation of said mean value.

3. The method according to claim 1, wherein said at least a first traffic statistics parameter comprises an indication of traffic distribution selected from a group of traffic distributions comprising a normal distribution, an exponential distribution, a flat distribution, a triangle distribution, or a discrete normal distribution.

4. The method according to claim 1, wherein said broadcast transmission sessions are Multimedia Broadcast Multicast Service (MBMS) sessions, and said broadcast transmission area is a MBMS Single Frequency Network (MBFSN) area.

5. The method according to claim 1, wherein said broadcast transmission area includes different radio cells controlled by different radio base stations.

6. The method according to claim 1, wherein resynchronizations are scheduled at regular intervals.

7. The method according to claim 1, the method further comprising:
   obtaining a quality of service class identifier associated with said first broadcast transmission session, and
   obtaining from said quality of service class identifier a maximum bit error loss rate, wherein said first bit error rate threshold is based on said maximum bit error loss rate.

8. The method according to claim 1, wherein said traffic statistics parameter includes a Guaranteed Bit Rate and a Maximum Bit Rate for the Broadcast session.

9. The method according to claim 8, wherein an average bit rate for the broadcast session is estimated to be equal to the Guaranteed Bit Rate, and a standard deviation for the broadcast session is estimated to be equal to (Maximum Bit Rate-Guaranteed Bit Rate)/2.

10. The method according to claim 1, wherein said traffic statistics parameter is a Guaranteed Bit Rate and a Maximum Bit Rate for the Broadcast session.

11. A method in a network node for admission control of broadcast transmission sessions in a broadcast transmission area, the method comprising: receiving a broadcast transmission session start request for a first broadcast transmission session,
- obtaining at least a first traffic statistics parameter related to said first broadcast transmission session,
- obtaining an available bit rate for the broadcast transmission area,
- obtaining a re-synchronization parameter indicating a time between re-synchronization of transmissions for said first broadcast transmission session,
- calculating a first expected bit error rate based on said at least first traffic statistics parameter, said available bit rate and said re-synchronization parameter,
- admitting said first broadcast transmission session if said first expected bit error rate is less than a first bit error rate threshold,
- receiving a broadcast transmission session start request for a second broadcast transmission session,
- obtaining at least a second traffic statistics parameter related to said second broadcast transmission session,
- re-calculating said first expected bit error rate based on said at least first and second traffic statistics parameter, said available bit rate and said re-synchronization parameter,
- calculating a second expected bit error rate based on said at least first and second traffic statistics parameter, said available bit rate and said re-synchronization parameter, and
- admitting said second broadcast transmission session if said re-calculated first expected bit error rate is less than said first bit error rate threshold and said at least second expected bit error rate is less than a second bit error rate threshold.

12. The method according to claim 11, wherein said first expected bit error rate is calculated by estimating an average number of bits remaining in a transmit buffer for said first broadcast transmission session at re-synchronization using said at least first traffic statistics parameter and dividing by an estimated number of transmitted bits for said first broadcast transmission session during the time between re-synchronization.

13. The method according to claim 11, wherein each of said at least first traffic statistic parameter and said at least second traffic statistics parameter comprises an indication of traffic distribution comprising a normal distribution, an exponential distribution, a flat distribution, a triangle distribution, or a discrete normal distribution.

14. The method according to claim 11, wherein each of said at least first traffic statistics parameter and said at least second traffic statistics parameter comprises a mean value indicating an expected average amount of received bits per time interval and a standard deviation of said mean value.

15. A network node adapted to perform admission control of broadcast transmission sessions comprising processing hardware configured to execute the method as specified in claim 1.

16. The network node according to claim 15, wherein said network node is a Multi-cell/Multicast Coordination Entity (MCE).

* * * * *